United States Patent
Oravainen et al.

(10) Patent No.: US 9,643,214 B2
(45) Date of Patent: May 9, 2017

(54) METHOD AND APPARATUS FOR SORTING PIECES OF ROCK CONTAINING QUARTZ VEIN FROM PIECES OF ROCK AND COMPUTER PROGRAM FOR A PROCESSING DEVICE

(71) Applicant: OUTOTEC (FINLAND) OY, Espoo (FI)

(72) Inventors: Heikki Oravainen, Helsinki (FI); Markku Meriläinen, Espoo (FI); Pekka Lovén, Helsinki (FI)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 15/100,650

(22) PCT Filed: Dec. 1, 2014

(86) PCT No.: PCT/FI2014/050937
§ 371 (c)(1),
(2) Date: Jun. 1, 2016

(87) PCT Pub. No.: WO2015/082768
PCT Pub. Date: Jun. 11, 2015

(65) Prior Publication Data
US 2016/0303613 A1    Oct. 20, 2016

(30) Foreign Application Priority Data

Dec. 3, 2013  (FI) ..................... 20136211

(51) Int. Cl.
*B07C 5/342* (2006.01)
*G06T 7/90* (2017.01)

(52) U.S. Cl.
CPC ............. *B07C 5/342* (2013.01); *G06T 7/90* (2017.01)

(58) Field of Classification Search
CPC  B07C 5/342; G06T 7/00; G06T 7/408; G06T 1/00
(Continued)

(56) References Cited

U.S. PATENT DOCUMENTS 3,097,744 A   7/1963  Hutter et al.
3,545,610 A   12/1970 Leonard et al.
(Continued)

FOREIGN PATENT DOCUMENTS

GB    2481804 A       1/2012
WO    2005057908  *   6/2005  .............. G06K 9/00
                                            382/100

OTHER PUBLICATIONS

Search Report issued by the Finnish Patent and Registration Office in relation to Finnish Application No. 20136211 dated Jun. 30, 2014 (2 page).

(Continued)

*Primary Examiner* — Terrell Matthews
(74) *Attorney, Agent, or Firm* — Robert P. Michal, Esq.; Carter, Deluca, Farrell & Schmidt, LLP

(57) ABSTRACT

A method, apparatus and non-transitory computer readable medium for sorting out pieces of rock containing quartz vein includes receiving an electric signal representing an image of a piece of rock to be sorted; determining the number of pixels in the image having a predetermined color value that is indicative of presence of quartz; and in case the number of the pixels having said predetermined color value exceeds a predetermined threshold value, the method comprises as step for identifying from the image linear forms between the area of the pixels having said predetermined color value and the area of pixels representing the rest of the piece of rock, (Continued)

Figure 1:
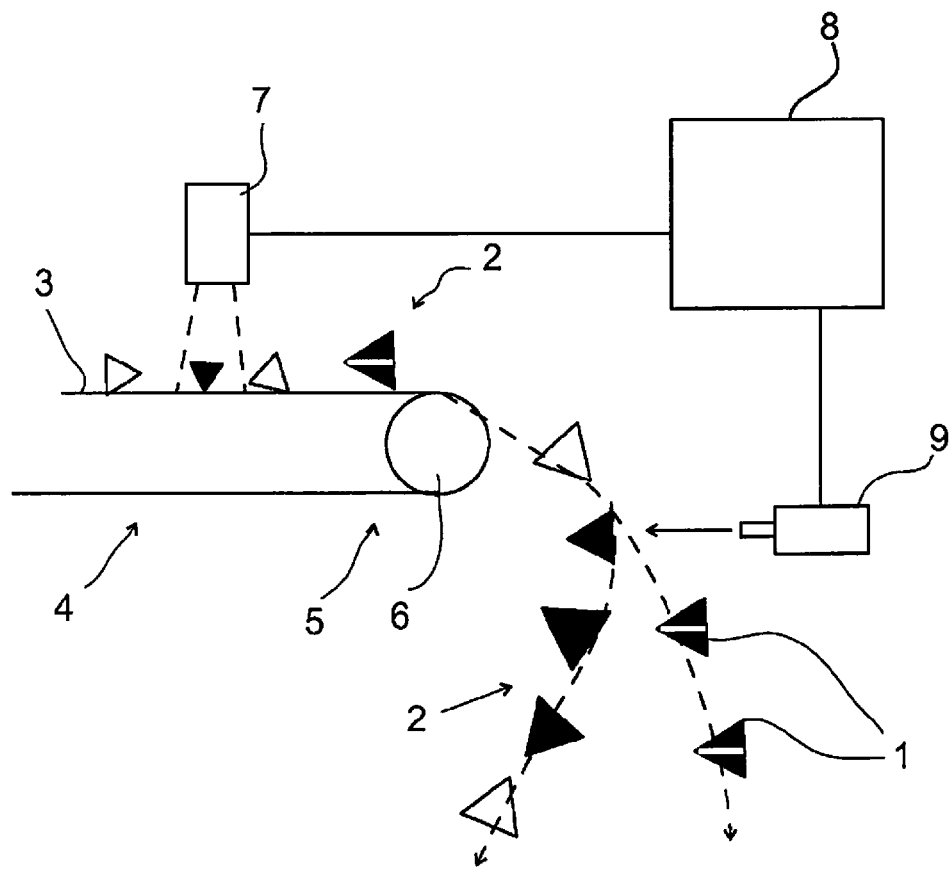

and in case linear forms is, the method comprises a step for generating a control signal for controlling a deviator device to perform a sorting action.

7 Claims, 4 Drawing Sheets

(58) Field of Classification Search
USPC .................................................. 209/580, 939
See application file for complete search history.

(56) References Cited

U.S. PATENT DOCUMENTS

| 3,786,266 | A | | 1/1974 | Reid et al. | |
|---|---|---|---|---|---|
| 3,962,403 | A | | 6/1976 | Wyslouzil | |
| 4,122,952 | A | * | 10/1978 | Richards | B07C 5/366 |
| | | | | | 209/579 |
| 4,600,105 | A | * | 7/1986 | Van Zyl | B07C 5/3425 |
| | | | | | 209/576 |
| 4,741,042 | A | * | 4/1988 | Throop | B07C 5/3422 |
| | | | | | 209/587 |
| 5,471,311 | A | * | 11/1995 | van den Bergh | B07C 5/3416 |
| | | | | | 250/226 |
| 2003/0072484 | A1 | | 4/2003 | Kokko et al. | |
| 2006/0262972 | A1 | | 11/2006 | Hiraoka | |
| 2008/0192987 | A1 | | 8/2008 | Helgason et al. | |
| 2013/0186992 | A1 | | 7/2013 | Wellwood et al. | |
| 2015/0310294 | A1 | * | 10/2015 | Keskes | G06K 9/38 |
| | | | | | 382/109 |

OTHER PUBLICATIONS

International Preliminary Report on Patentability (Chapter 1 of the Patent Cooperation Treaty) issued by the International Bureau on behalf of the International Searching Authority in relation to International Application No. PCT/FI2014/050937 dated Jun. 7, 2016 (1 pages).

Written Opinion of the International Searching Authority issued by the European Patent Office in relation to International Application No. PCT/FI2014/050937 (5 pages).

International Search Report for PCT/FI2014/050937 dated Feb. 12, 2015 (2 pages).

* cited by examiner

METHOD AND APPARATUS FOR SORTING PIECES OF ROCK CONTAINING QUARTZ VEIN FROM PIECES OF ROCK AND COMPUTER PROGRAM FOR A PROCESSING DEVICE

CROSS-REFERENCE TO RELATED APPLICATIONS

This application is a National Phase Entry under 35 USC §371 of PCT Patent Application Serial No. PCT/FI2014/050937 filed Dec. 1, 2014, the disclosure of which is expressly incorporated herein by reference in its entirety.

FIELD OF THE INVENTION

The invention relates to a method for sorting out pieces of rock containing quartz vein from pieces of rock as defined in the preamble of independent claim 1.

The invention also relates to an apparatus for sorting out pieces of rock containing quartz vein from pieces of rock as defined in the preamble of independent claim 8.

The invention also relates to a computer program for a processing device as defined in the preamble of independent claim 11.

The invention also relates use of the method, or of the apparatus or of the computer program for sorting out pieces of rock containing quartz vein.

The invention relates to sorting out pieces of rock containing quartz vein. In the field of gold mining, it is known in the art that gold is usually contained in rock having quartz veins.

Irregularly shaped objects may be sorted by making repeated scans across each object to detect light reflected from the object's surface.

Ore objects or ore containing objects may be distinguished by light reflected from a laser beam arranged to scan across each of the objects to be sorted. Where the surface of the object is transmitting to the light a halo is produced by certain objects caused by internal scattered reflections of the light. By monitoring the occurrence or degree of occurrences of halos clean distinction of respective objects can be made. In a particular application, the identification of the presence of quartz pebbles in rock specimens can be used for detecting and sorting gold containing objects.

OBJECTIVE OF THE INVENTION

The objective of the invention is to provide a method, an apparatus, and a computer program for sorting out pieces of rock having predetermined properties.

SHORT DESCRIPTION OF THE INVENTION

The method is characterized by the definitions of independent claim 1.

Preferred embodiments of the method are defined in dependent claims 2 to 7.

The apparatus is characterized by the definitions of independent claim 8.

Preferred embodiments of the method are defined in dependent claims 8 to 10.

The computer program is characterized by the definitions of independent claim 11.

The invention also relates use of the method, or of the apparatus or of the computer program for sorting out pieces of rock containing quartz vein as defined in claim 12.

To sort out pieces of rock containing both quartz vein and other type of rock is particularly advantageous, because gold contained in quartz vein tend in some locations to be more concentrated in the part of the quartz vein that is closer to the sides of the quartz vein than towards the middle of the quartz vein. To sort out pieces of rock containing both quartz vein and other type of rock allows sorting out pieces of rock containing a narrow quartz vein. In the method and by the apparatus pieces of rock containing both quartz vein and other type of rock is sorted out by firstly identifying if a piece of rock fulfills a certain color criteria, and in case a piece of rock fulfills said certain color criteria, to identify, if the piece of rock has linear forms between the area fulfilling said color criteria and the rest of the piece of rock. Linear forms are looked for, because quartz veins are normally linear formations in rocks.

LIST OF FIGURES

Figure 2:
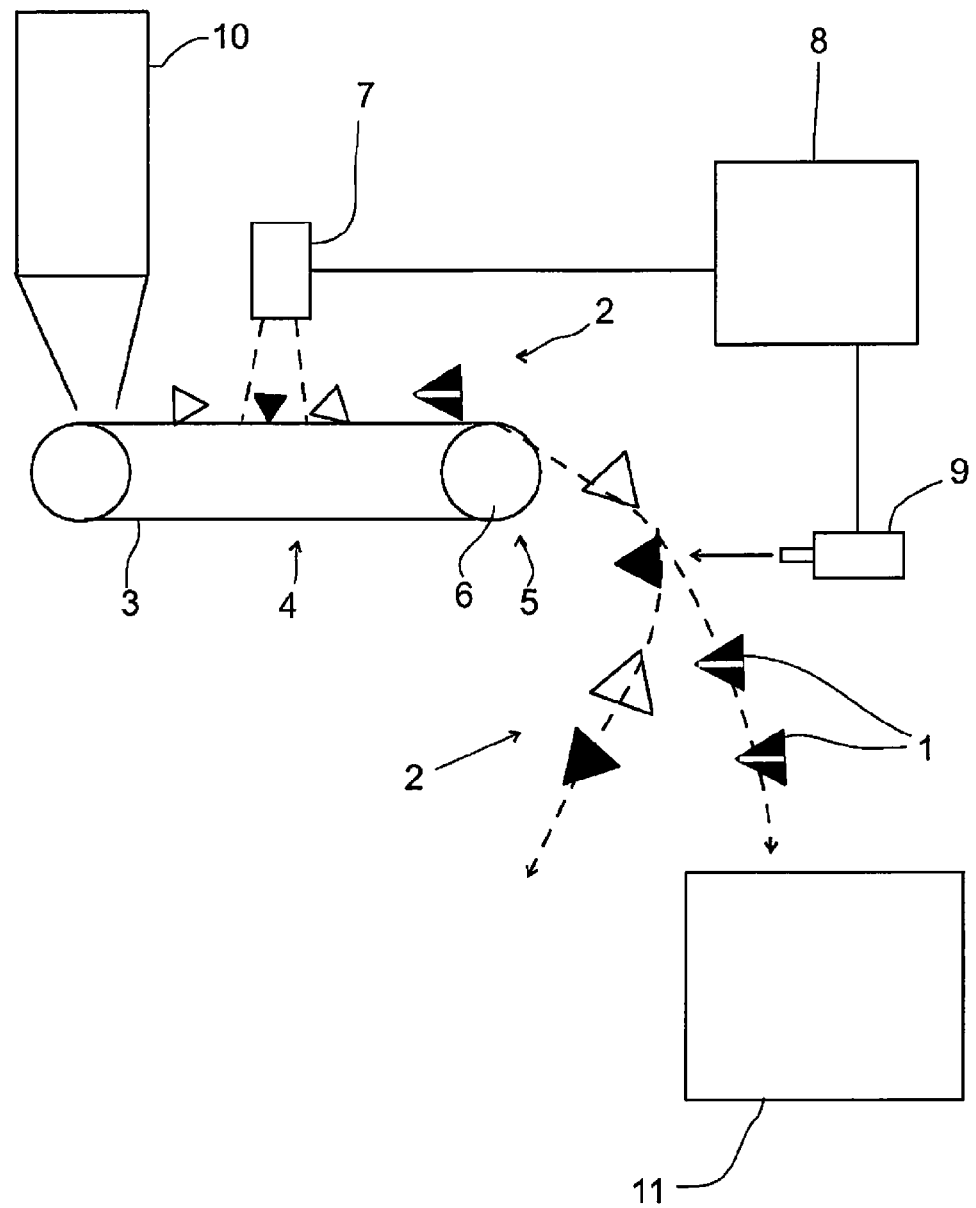
Figure 3:
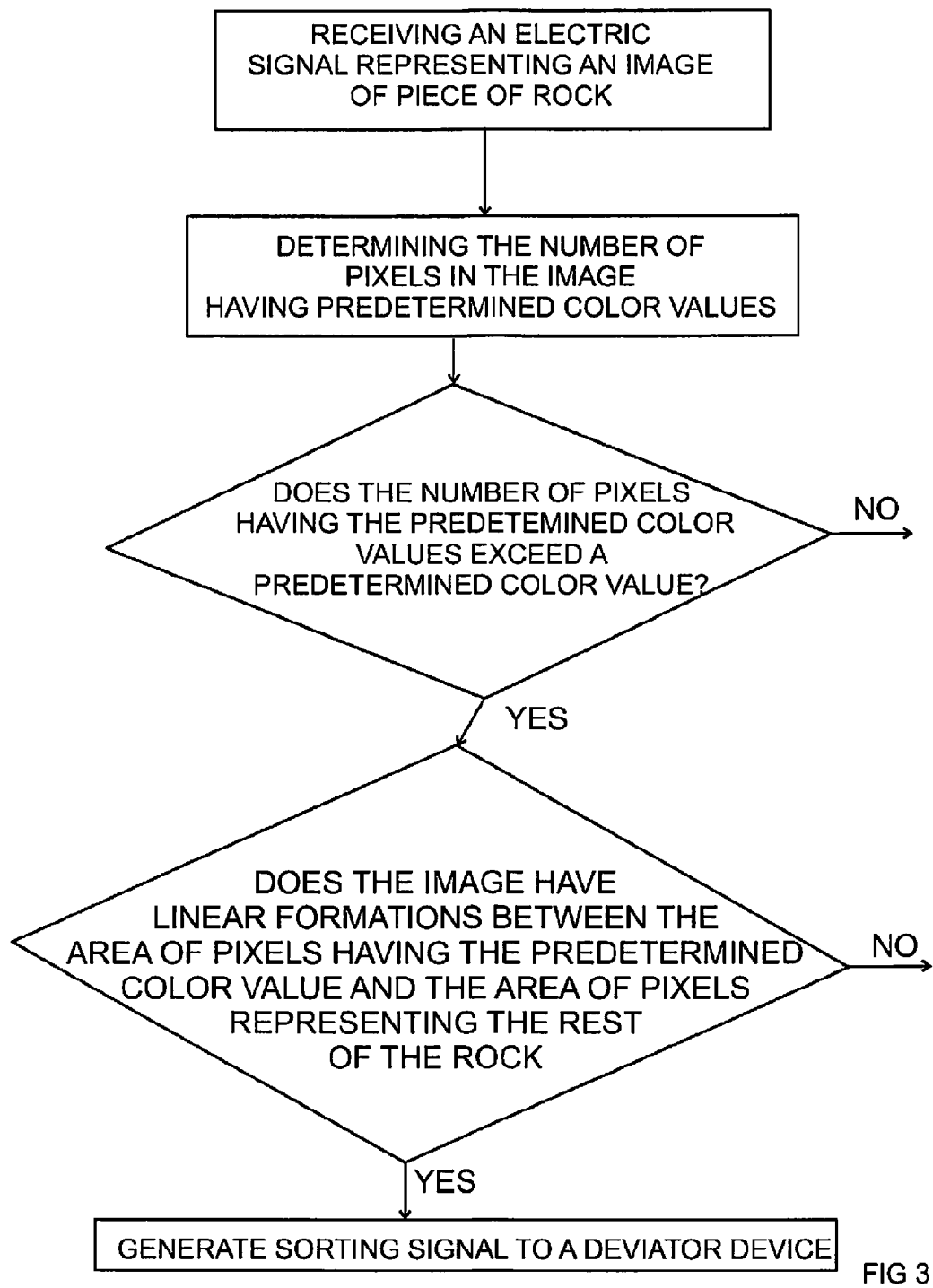

In the following embodiments of the invention will described in more detail by referring to the figures, which FIG. 1 is a schematic illustration of a system where embodiments of the invention may be used, FIG. 2 is a schematic illustration of another system where embodiments of the invention may be used, FIG. 3 shows steps of a computer program product according to an embodiment, and.

Figure 4:
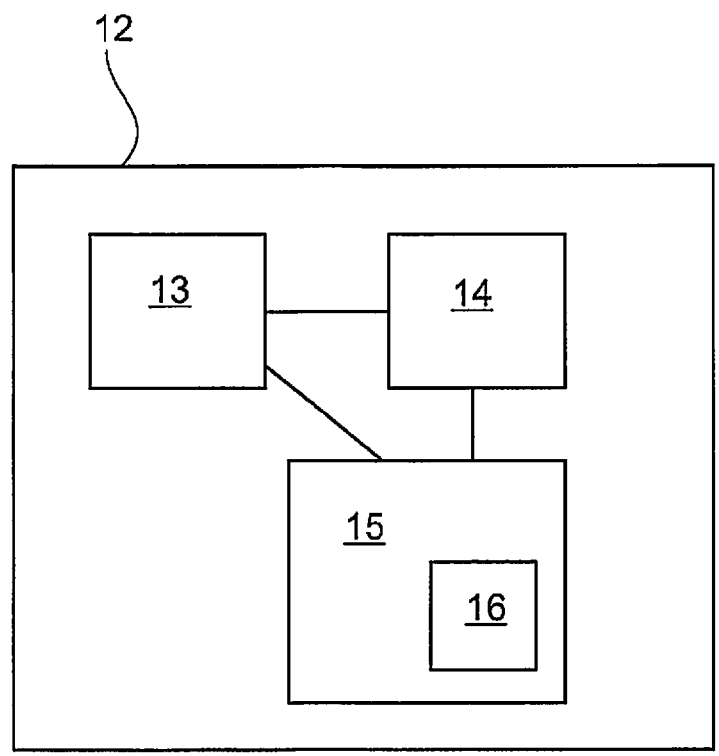

FIG. 4 shows an apparatus according to an embodiment of the invention

DETAILED DESCRIPTION OF THE INVENTION

The invention relates to a method and to an apparatus for sorting out pieces of rock containing quartz vein from pieces of rock and to a computer program for a processing device.

First the method for sorting out sorting out pieces of rock containing quartz vein from pieces of rock and some embodiments and variants of the method will be described in greater detail.

The method comprises receiving an electric signal representing an image of a piece of rock (not marked with a reference numeral). The piece of rock may move along a path, such as a conveyor belt as depicted in FIGS. 1 and 2.

The method comprises determining the number of pixels in the image having a predetermined color value that is indicative of presence of quartz. The predetermined color value may be a single or scalar value, such as a value representing the brightness of a pixel in a grey scale image, or a vector value representing a plurality of color components such as those used in the RGB color scheme. In the method, a single predetermined color value or several predetermined color values may be used.

The predetermined color value depends on the kind of rock and ore contained therein, and is typically determined by training the sorting system using samples representing rocks containing quarts. In sorting out pieces of rock containing quartz vein, the criteria for determining the predetermined pixel color value are may be that the pixels to be sought have a light color, and the contrast between the pixels to be sought and the pixels representing the rest of the piece of rock surface is substantially high. These criteria can be investigated and implemented using commercially available image processing software.

In the method, in case the number of the pixels having said predetermined color value exceeds a predetermined threshold value, the method comprises a step for identifying from the image linear forms between the area of the pixels having said predetermined color value and the area of pixels representing the rest of the piece of rock, and in case linear forms is identified between the area of the pixels having said predetermined color value and the area of pixels representing the rest of the piece of rock, generating a control signal for controlling a deviator device 9 configured for sorting out pieces of rock 1 having such linear forms from a group of pieces of rock 2.

In an embodiment of the method, the pieces of rock 2 move along a path. In this embodiment of the method, the control signal may include instructions for causing the deviator device 9 to deviate the piece of rock 2 having such linear forms from the path. In another embodiment of the method, the control signal may include instructions for causing the deviator device 9 to keep the piece of rock 2 having such linear forms on the path. The electric signal representing an image of a piece of rock to be sorted may be produced using equipment that are known in the art.

The predetermined threshold value may be set by calibration using sample pieces of rock (not shown in the drawings).

The predetermined range may be a range within the overall range from a number greater than 0% to less than 100%, preferably between 5% and 25%. For example, in an exemplary embodiment of sorting out rocks containing quartz veins, the predetermined range typically includes values ranging from a value greater than 0% to 5%.

Next the apparatus for sorting out pieces of rock containing quartz vein from pieces of rock and some embodiments and variants of the apparatus will be described in greater detail.

The apparatus comprises a communication module 13 for sending and receiving electric signals.

The apparatus comprises a memory 14 for storing a computer program.

The apparatus comprises a processor 15 for executing the computer program 16, said computer program controlling the processor to:

receive through the communication module an electric signal representing an image of a piece of rock to be sorted;

determine the number of pixels in the image having predetermined color values that is indicative of presence of quartz;

in case the number of the pixels having said predetermined color values exceeds a predetermined threshold value, to identify from the image linear forms between the area of the pixels having said predetermined color value and the area of pixels representing the rest of the piece of rock, and in case linear forms is identified between the area of the pixels having said predetermined color value and the area of pixels representing the rest of the piece of rock, to generate a control signal for controlling a deviator device 9 configured for sorting out pieces of rock having such linear forms.

In an embodiment, the pieces of rock move along a path. In this embodiment of the apparatus, the control signal may include instructions configured for causing the deviator device to deviate the piece of rock 1 having such linear forms from the path. In another embodiment, the control signal may include instructions configured for causing the deviator device 9 to keep the piece of rock 1 having such linear forms on the path. In this embodiment of the apparatus, the apparatus may further comprise imagining means 7 for producing The electric signal representing an image of a piece of rock may be produced using imaging means known in the art.

The computer program controlling the processor may be configured to set the predetermined threshold value by calibration using sample pieces of rock.

The computer program controlling the processor may be configured to use a range from a value greater than 0% to less 100%, preferably between 5% and 25%, as the predetermined range. In a preferred embodiment, the values range from a value greater than 0% to 5 percent.

Next the computer program for a processing device and some embodiments and variants of the computer program will be described in greater detail.

The computer program comprises program code for receiving an electric signal representing an image of a piece of rock to be sorted.

The computer program comprises program code for determining the number of pixels in the image having a predetermined color value that is indicative of presence of quartz.

The computer program comprises program code for in case the number of the pixels having said predetermined color value exceeds a predetermined threshold value, to identify from the image linear forms between the area of the pixels having said predetermined color value and the area of pixels representing the rest of the piece of rock, and in case linear forms is identified between the area of the pixels having said predetermined color value and the area of pixels representing the rest of the piece of rock, to generate a control signal for controlling a deviator device configured for sorting out pieces of rock having said relative area of the pixels having said predetermined color value within said predetermined range.

The computer program for a processing device may comprise a computer-readable medium on which the software code portions are stored.

The computer program for a processing device may be directly loadable into an internal memory of the processing device.

FIGS. 1 and 2 shows a system suitable for carrying out embodiments of the invention.

The system shown in FIGS. 1 and 2 comprises a moving means (not marked with a reference numeral) in the form of a belt conveyor 4 comprising an endless belt 3 for supporting and transporting pieces of rock 1. The belt conveyor 4 comprises an end 5 at which the endless belt 3 of the belt conveyor 4 passes over a head roller 6. The endless belt 3 of the belt conveyor 4 is configured for transporting a group of pieces of rock 2 along a path in the direction towards the end 5 of the belt conveyor 4 for discharging the group of pieces of rock 2 from the endless belt 3 of the belt conveyor 4 so that the group of pieces of rock 2 falls freely in said path from the endless belt 3 of the belt conveyor 4.

The system shown in FIGS. 1 and 2 comprises imagining means 7 for producing an image of a piece of rock transported on the endless belt 3 of the belt conveyor 4 to obtain an image of a piece of rock.

The system shown in FIGS. 1 and 2 comprises a communication module 8 for sending electric signals to a deviator device 9 and for receiving electric signals from the imaging means 7. In the system shown in FIGS. 1 and 2 the memory (not shown in the figures) for storing the computer program and the processor (not shown in the figures) for executing the computer program are parts of the commination module 8.

The system shown in FIGS. 1 and 2 comprises said deviator device 9 for receiving control signals from the communication module 8 and for by using the control signals produced by means of the communication module 8 sorting out pieces of rock 1 having mentioned linear forms as the group of pieces of rock 2 falls freely from the endless belt 3 of the belt conveyor 4.

The moving means of the arrangement may, as shown in FIG. 2, be in communication with crushing means 10 for receiving the group of pieces of rock 2 having a particle size in the range of about 10 mm to about 200 mm, such as a particle size in the range of about 40 mm to about 150, mm from the crushing means 10.

The arrangement may, as shown in FIG. 2, be in communication with grinding means 11 for grinding pieces rock 1 having mentioned linear forms.

The deviator device 9 of the arrangement may, as shown in FIG. 1 and FIG. 2, comprise gas blast nozzles configured for, based on the control signal produced by the processor, blowing gas on either pieces of rock 1 having mentioned linear forms or on members of the group of pieces of rock 2 to separate pieces of rock 1 having mentioned linear forms from the group of pieces of rock 2.

The invention relates also to the use of the method, of the apparatus, or of the computer program for sorting out pieces of rock containing quartz vein, where the thickness of the quartz vein is less than about 5 mm, preferably in the range between about 0.5 mm and about 5 mm.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A method for sorting pieces of rock containing quartz vein from pieces of rock, the method comprising:
    receiving an electric signal representing an image of a piece of rock to be sorted;
    determining a number of pixels in the image having a predetermined color value that is indicative of a presence of quartz; and
    in a case where the number of pixels having the predetermined color value exceeds a predetermined threshold value, identifying, from the electric signal representing image, linear forms between an area of pixels having the predetermined color value and an area of pixels representing a remainder of the piece of rock; and
    in a case where the linear forms are identified between the area of the pixels having the predetermined color value and the area of pixels representing the remainder of the piece of rock, generating a control signal for controlling a deviator device to perform a sorting action for sorting the piece of rock having the linear forms.

2. The method according to claim 1, wherein the pieces of rock move along a path.

3. The method according to claim 2, wherein the control signal includes instructions for causing the piece of rock having the linear forms to be sorted to deviate from the path.

4. The method according to claim 2, wherein the control signal includes instructions for causing the piece of rock having the linear forms to be sorted to stay on the path.

5. The method according to claim 1, wherein the predetermined color value is set by calibration using sample pieces of rock containing quartz vein.

6. The method according to claim 1, wherein the predetermined range includes values from a positive value greater than 0% to less than 100%.

7. The method according to claim 1, wherein the method further comprises providing pieces of rock having a particle size between about 10 mm and about 200 mm.

* * * * *